United States Patent
Ryan et al.

(10) Patent No.: US 6,477,435 B1
(45) Date of Patent: Nov. 5, 2002

(54) AUTOMATED PROGRAMMING SYSTEM FOR INDUSTRIAL CONTROL USING AREA-MODEL

(75) Inventors: Stephen D. Ryan, Vernon, WI (US); Randall A. Havner, Atlanta, GA (US); Kam P. Yuen, Menomonee Falls, WI (US); Clifford J. Whitehead, Cleveland, OH (US); James F. Toman, Temecula, CA (US)

(73) Assignee: Rockwell Software Inc., West Allis, WI (US)

( * ) Notice: Subject to any disclaimer, the term of this patent is extended or adjusted under 35 U.S.C. 154(b) by 0 days.

(21) Appl. No.: 09/404,771

(22) Filed: Sep. 24, 1999

(51) Int. Cl.[7] .............................................. G05B 19/42
(52) U.S. Cl. ........................................ 700/86; 700/182
(58) Field of Search .......................... 700/180, 86, 182, 700/181, 121, 17, 83, 84, 96, 97

(56) References Cited

U.S. PATENT DOCUMENTS 5,812,394 A  * 9/1998 Lewis et al. ................. 345/846
5,822,206 A  * 10/1998 Sebastian et al. ............ 700/182
6,161,051 A  * 12/2000 Hafemann et al. ............ 700/17

* cited by examiner

Primary Examiner—Leo Picard
Assistant Examiner—Kidest Bahta
(74) Attorney, Agent, or Firm—Keith M. Baxter; Alexander M. Gerasimow; William R. Walbrun

(57) ABSTRACT

A development tool for control programs for industrial controllers develops an area-model detailing equipment and phases of operation of the equipment of a controlled process. This area-model is used as a framework for integrating reusable program fragments together into a cohesive control program. The area-model provides a naming convention for otherwise conflicting variables of the reused control components that preserves the identity of the control variables for subsequent programming. The renaming convention may be tracked so that other program portions stored together with the control program fragments in a library of object templates may be interconnected through the same or other editing systems.

20 Claims, 3 Drawing Sheets

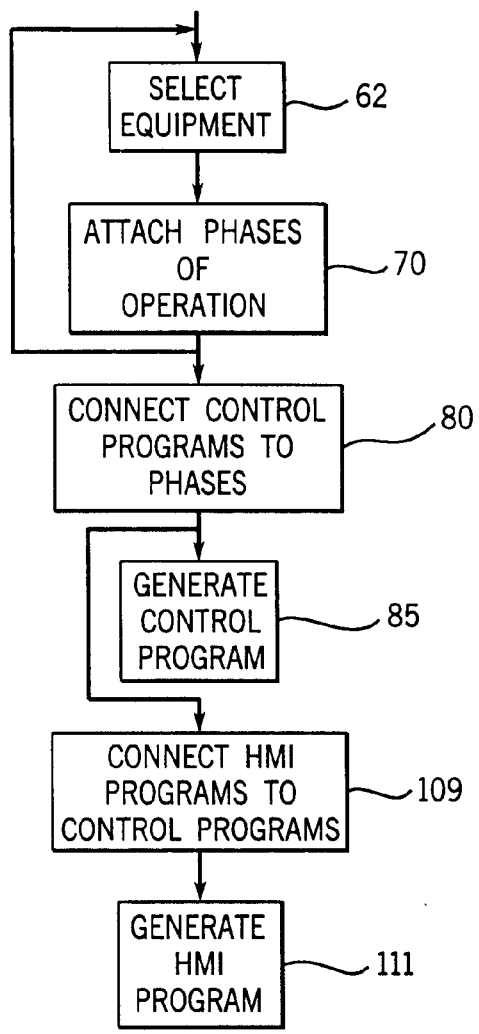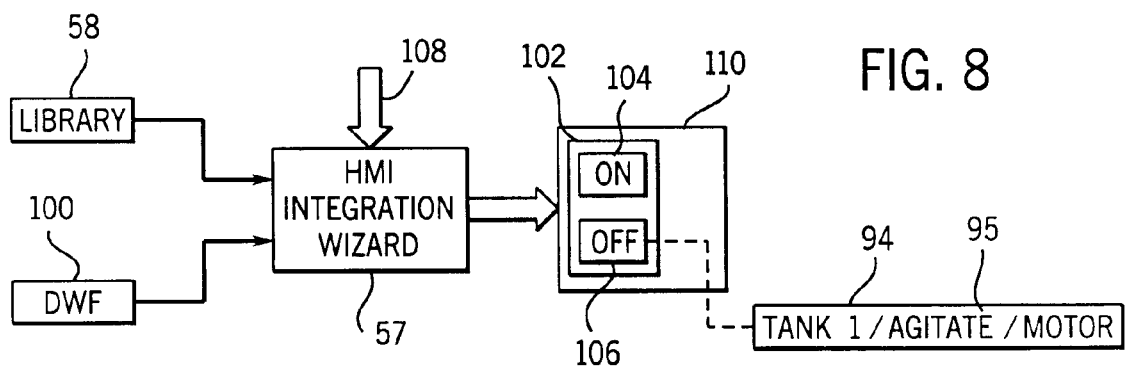

AUTOMATED PROGRAMMING SYSTEM FOR INDUSTRIAL CONTROL USING AREA-MODEL

BACKGROUND OF THE INVENTION

The present invention relates to industrial controllers for controlling industrial processes or manufacturing equipment and in particular to a method of simplifying the programming of industrial controllers.

Industrial controllers are special purpose computers used for controlling controlled processes or manufacturing equipment. Under the direction of a stored control program, the industrial controller examines a set of inputs reflecting the status of the controlled process and changes a set of outputs controlling the controlled process based on control logic of the control program. The inputs and outputs may be binary, that is on or off, or analog, providing a value within a continuous range. Typically analog signals are converted to binary words for processing.

Unlike conventional computers which normally run standardized applications, industrial controllers often operate programs uniquely tailored for a particular control situation. Accordingly, it is important to be able to efficiently and easily program industrial controllers.

In this regard, it is known to reuse elemental portions of other control program "fragments" in creating the control logic of a control program for a particular job. This may be done by copying the program fragments and inserting them one or more times within the body of the control program to be developed.

A characteristic feature of most control programs is the use of a large number of input and output variables, each corresponding to control points on the controlled process. The input and output variables of the reused program fragments, when integrated into the body of the control program being developed, must be re-named and cross referenced so as to preserve the uniqueness of the variable names for each program fragment and so as to keep track of the variable's relationship both to the controlled process and to the program fragment of which it is a part. This renaming and cross-referencing is a laborious task.

After the control logic is complete, a human machine interface (HMI) may be developed providing for software control or monitoring of input and output variables and of the controlled process itself. Such monitoring may use one or more virtual controls (e.g., pushbuttons or the like displayed on a computer monitor) and/or animations of equipment during particular input and output states. The program fragment underlying each virtual control or animation may be reused in the same way that program fragments are reused for the control logic. Such reuse imposes a similar burden in renaming input and output variables, and the additional burden of cross-referencing of the variables of the HMI program fragments to the variables of the control logic which they portray.

HMI program fragments cannot normally be preconnected to corresponding control logic because this limits the programmer's flexibility to omit HMI for some control logic and to use multiple HMI for other control logic. Connecting HMI program fragments to the appropriate control logic program fragments is complicated by the earlier renaming of the control variables of the control logic fragments during their integration into the body of the control program being developed.

What is needed is a method of constructing control programs having control logic and HMI program fragments that greatly simplifies the process of renaming variables and in keeping track of their relationship to the underlying program fragments and to the controlled process as a whole.

BRIEF SUMMARY OF THE INVENTION

The present invention provides a tool for simplifying the development of control programs including control logic and HMI, by using a library of predeveloped program fragments. The invention simplifies the problem of renaming variables incident to program fragment reuse by enforcing an overarching framework on the development of the control program, specifically, that of an "area-model" representing physical equipment and phases of operation of that equipment. This area-model follows the framework of the S88 model developed by the International Society of Measurement and Control so as to be familiar to control engineers.

Using the area-model as a development framework, program fragments are attached to particular phases of the model and derive their name from the hierarchy of the area-model through the simple process of concatenating onto variable names the names of equipment and phases of the corresponding portions of the area-model. In this way, individual variables retain their identity and yet are ensured to be unique within the control program.

Specifically then, the present invention provides a development tool for creating control programs executable on an industrial controller to control a controlled process. The development tool may be implemented on an electronic computer and includes an area-model developer which generates an area-model representing physical equipment and phases of operation of the physical equipment used in the controlled process. The area-model links phases of operation to physical equipment hierarchically. The development tool further includes a library providing different program fragments executable on the industrial controller to perform the phases of operation, where the program fragments have variables representing physical inputs or physical outputs communicating with the controlled process. A program integration wizard receives the area-model and the library and accepts input from a user to match program fragments of the library to phases of operation of particular equipment in the area-model to produce the control program. Upon the matching, the program integration wizard uniquely denotes the control variables of all program fragments in the control program according to the hierarchy of the area-model.

Thus, it is one object of the invention to provide for a logical and automatic renaming of the variables of program fragments to be unique within the context of the control program by making use of the natural framework provided by the organizational structure of the area-model.

The area-model developer may provide a unique tag for each piece of physical equipment when multiple instances of the same physical equipment are used in the area-model and may develop a unique tag to represent each phase of operation when multiple instances of the same type of phase of operation are used in the area-model. The unique tag for the phase of operation may be concatenated onto the control variables of the program fragment thereby creating a unique variable name.

Thus, it is another object of the invention to provide for a simple renaming convention following the hierarchy of the area-model while preserving the fundamental identity of the original control variable such as may be needed for connection of the control variable to other control variables or to HMI variables for an HMI program.

The connection of phases of operation to equipment may be done by manipulation of icons representing the phases of operation and the equipment.

It is another object of the invention, therefore, to provide an intuitive method for rapidly creating an area-model.

The program integration wizard may display juxtaposed depictions of the area-model and the program fragments and input from the user may be the dragging of representations of program fragments to phases of operation of the area-model.

Thus it is another object of the invention to provide for a simple method of integrating program fragments together to produce a control program making use of the visual paradigm of the area-model.

The development tool may include a second integration wizard receiving information about the matching of program fragments to phases of operation of the area-model and to accept further input from the user to match second program fragments to the first program fragments. The second program fragments may provide graphic interface to the user indicating values of the control variables used by the first program fragments.

Thus it is another object of the invention to allow information about the matching of program fragments to phases of operation to be used in subsequent integration steps so that other elements or reusable program, for example those generating human machine interfaces, can be readily connected using the renaming convention established during the first integration process.

The second program integration wizard may receive input from the user by providing a listing of second program fragments, the program fragments being selected as those having control variables with tags matching to tags of program fragments, prior to renaming, previously matched to phases of operation.

Thus it is another object of the invention to make use of the initial identity of program fragments to allow automated matching of variables between different program sections.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 3 is a flow chart showing a sequence of operations using the development tool of the present invention in generating an area-model and connecting program fragments using the area-model as a framework;

FIG. 8 is a data flow diagram showing use of the HMI integration wizard suing the wizard file with the HMI editor to produce and attach HMI program fragments to the control program previously produced and to correctly rename the variables to provide for inner communication between these program fragments and the control program previously produced.

DETAILED DESCRIPTION OF THE INVENTION

Figure 1:
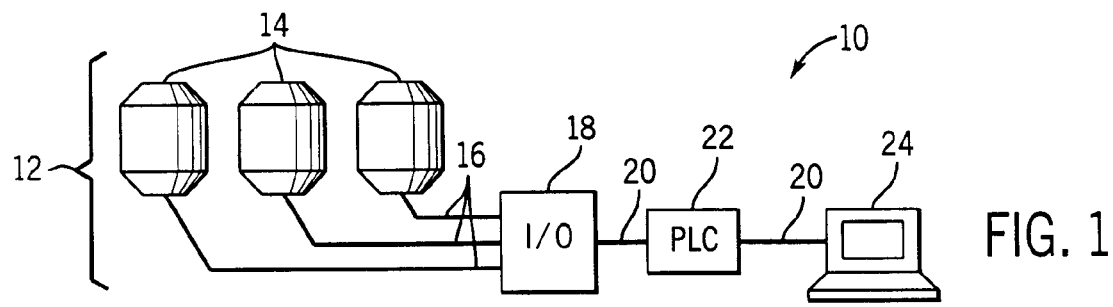
FIG. 1 is a simplified block diagram of an industrial controller communicating with equipment of a controlled process to receive inputs from the controlled process and transmitting outputs to the controlled process through an I/O module, the industrial controller further communicating with a programming terminal.

Referring now to FIG. 1, an industrial control system 10 is used to control a process 12 which, for example, may include several tanks 14 operating according to control variables communicated over lines 16. The control variables may be output signals controlling actuators or the like on the tanks 14 or may be inputs from sensors on the tanks 14 such as temperature sensors or motion sensors or level sensors.

The lines 16 are received by I/O circuits 18 providing for basic signal processing known in the art and for the conversion between analog signals and digital values for computer processing. The digital values may be communicated over link 20 between the I/O circuits 18 and a programmable logic controller 22. The programmable logic controller 22 also communicates either over link 20 or a separate link with a programming terminal 24 such as may be a conventional desktop computer.

Figure 2:
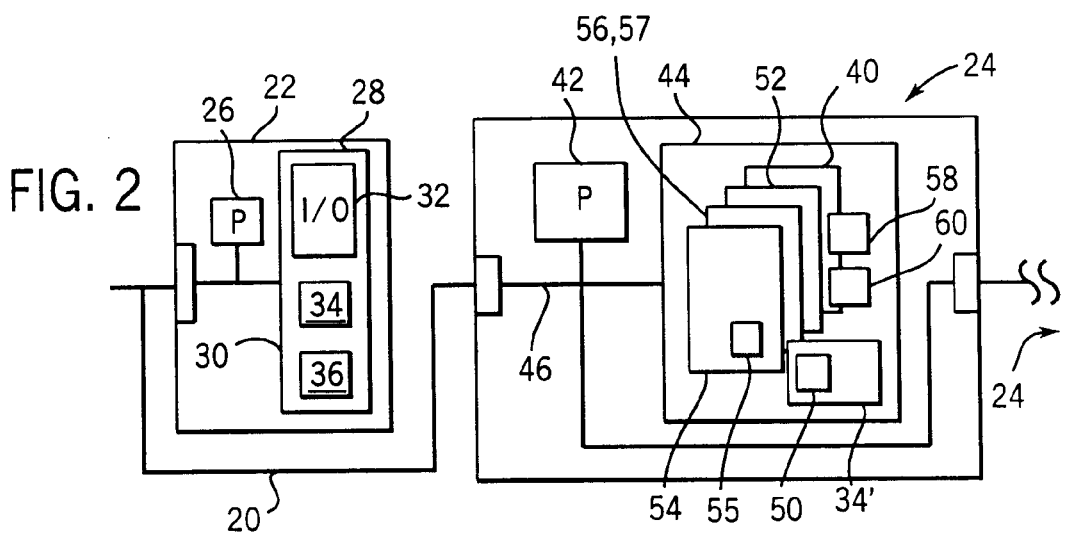
FIG. 2 is a detailed block diagram of the industrial controller and programming terminal of FIG. 1 showing the processor and memory of the programming terminal, the latter holding an operating system and a copy of the control program including an HMI program, as well as the development tools of the present invention including an area-model developer, a library of program fragments, two program integration wizards for connecting program fragments, the resultant area-model, and connection file.

Referring now to FIG. 2, the programmable logic controller 22 includes at least one processor 26 connected with an internal memory 28 via a bus 30 also communicating with link 20. The memory 28 includes an I/O table storing values of the control variables received from or transmitted to the I/O circuits 18, a control program 34 reading those I/O values and executing a control logic prepared by a programmer specifically for the controlled process 12, and various operating system programs 36 well understood in the art.

The control program 34 may be generated by the programming terminal 24 and downloaded from a control program copy 34' stored in memory 44 therein. The control program copy 34' may be generated by a control program developer 40 such as a function block programming language including, for example, the RS Logic Frameworks™ program manufactured by Rockwell Software Inc. of Wisconsin, the assignee of the present invention or other well known function block programming languages manufactured by others.

The control program developer 40 is executed on a processor 42 associated with the programming terminal 24, the processor 42 communicating via an internal bus 46 with the link 20 and the memory 44.

The memory 44 of the programming terminal also holds the control program developer 40 and the control program copy 34'. The control program copy 34' may include or be associated with a human machine interface HMI program 50, the latter which may remain on the programming terminal 24 to work in conjunction with the remainder of the control program 34 downloaded to the programmable logic controller 22 to provide an interface to the ongoing controlled process 12. This interface may provide for virtual controls that may display control variables or force control variables to particular values or animations or the like of the controlled process 12. The HMI program 50 may be generated by an HMI developer 52 such as the RS View 32™ language manufactured by the assignee of the present invention or other similar HMI scripting languages known in the art and also held in memory 44.

The memory 44 of the programming terminal 24 also includes an area-model developer 54, the resultant area-model 55, two program integration wizards 56 and 57, a connection file 60 produced by the one of the wizards 56 and 57, and a library 58 of program fragments all as will be described in more detail below.

Generally the present invention will make use of program fragments stored in the library 58 to assemble the downloadable control program copy 34' and the HMI program 50. Importantly, however, the assembly follows the step of generating the area-model 55 which is used as a framework to coordinate this process and to greatly reduce the amount of work necessary to properly designate input and output variables.

Figure 4:
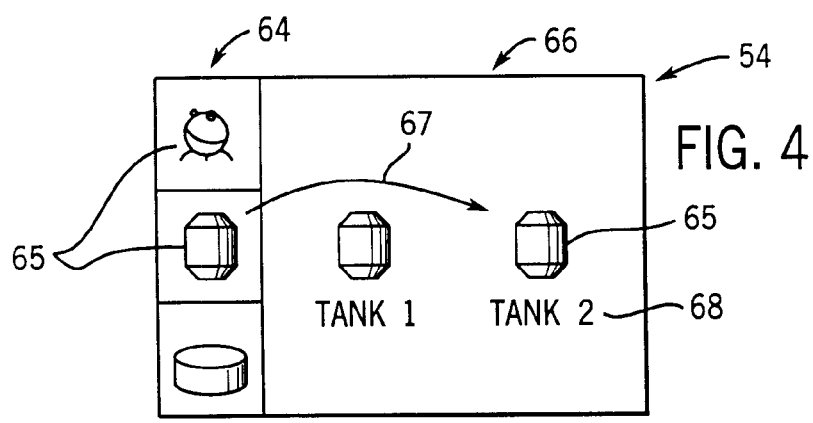
FIG. 4 is a view of a screen of the programming terminal of FIG. 1 during use of the area-model developer of the present invention in identifying equipment of an area-model.

Referring now to FIGS. 3 and 4, in the first steps of the present invention, indicated by process blocks 62 and 70 of FIG. 3, the area-model 55 is developed for the particular controlled process 12 (shown in FIG. 1). The area-model 55 conforms generally to the S88 standard mentioned above and is constructed through user interaction with a development screen of the area-model developer 54. Specifically, at the first process block 62, equipment for the area-model 55 is selected corresponding to the equipment of the controlled process 12 using a graphical interface presenting a left-hand palette 64 of various equipment icons 65 and a right-side workspace 66 representing the area-model 55 to be developed into which the equipment icons 65 may be dragged using a conventional "click and drag" technique known for use with user input devices such as a computer mouse or trackball.

As equipment icons 65 are dragged to the workspace 66, they are given a unique text tag 68. The tag 68 may be entered by the user to the keyboard of the programming terminal 24 holding the area-model developer 54. However the area-model developer 54 nevertheless monitors the entered tag 68 to ensure that no two icons 65 for equipment have the same tag 68. In a preferred embodiment, the area-model developer 54 accepts an arbitrary tag 68 for the first equipment icon 65 of a given equipment type and for each subsequent equipment icon 65 of that same type, appends to that tag 68 an integer number in sequence. So for example, if the user adds an equipment icon 65 representing a tank, using the word "tank" as the tag 68, subsequent equipment icons 65 of the tank-type adopt the tags 68 of "tank 2", "tank 3" and so forth automatically. The area-model developer 54 also ensures that unique tags 68 are assigned even to equipment icons 65 of different types. During this process, the tag 68 is entered into a list that forms part of the area-model 55 which is stored in memory 44. In the example of FIG. 4, two tanks named "tank1" and "tank2" are added to the area-model 55.

Figure 5:
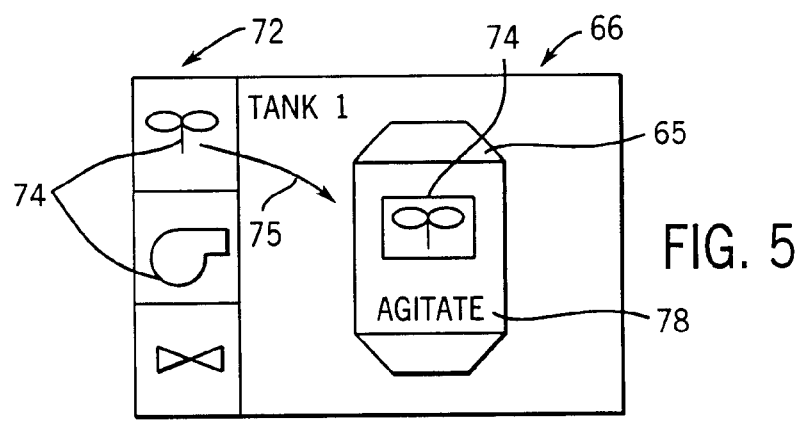
FIG. 5 is a figure similar to that of FIG. 4 showing the association of phases of operation to the equipment of the area-model identified in FIG. 4.

Referring now to FIGS. 3 and 5 at process block 70, the area-model developer 54 provides a new screen having a left side palette 72 listing various "phase of operation" icons 74 representing operations that may be associated with the equipment icons 65. For the purpose of matching phase of operation icons 74 to equipment icons 65, the workspace 66 shows a single equipment icon 65 in enlarged form indicating the particular piece of equipment to which the phases of operation will be attached. Again using the "drag and drop" technique, phase of operation icons 74 may be dragged to the workspace 66 to be affiliated with the particular piece of equipment having focus in workspace 66 as indicated by arrow 75. As before, each phase of operation icons 74 is given a unique tag 78 that may be arbitrarily selected by the user to comport with the terminology of the controlled process 12. Again the area-model developer 54 monitors the tags 78 to ensure that for any given piece of equipment represented by an equipment icon 65, there are no two tags for phase of operation icons 74 that are the same. Again this may be accomplished by appending an integer to the tag as additional phase of operation icons 74 of similar type are added to a particular piece of equipment. The list of equipment tags 68 of the area-model 55 is then annotated with the tags 78 of the associated phases of operation icons 74, the latter dependent to make a hierarchical tree structure. In the example of FIG. 5, a phase of operation denoted by the tag "agitate" is added to the equipment of "tank1" and "tank2" (the latter not shown in FIG. 5).

Referring to FIG. 3, the process blocks of 62 and 70 may be repeated until an area-model 55 is generated representing the entire controlled process 12. The essence of the area-model 55 is the hierarchical list of tags 68 and 74.

Once the area-model 55 is completed at process block 80, control program fragments from the library 58 are connected according to the phases of operation of the area-model 55 using the control program integration wizard 56 whose operation will now be described.

Figure 6:
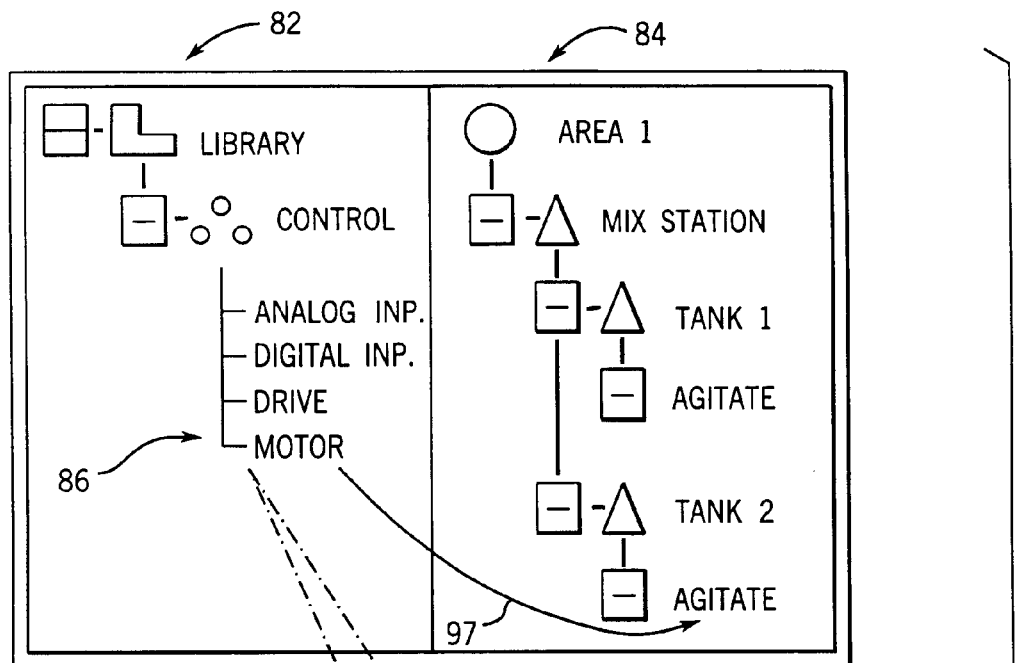
FIG. 6 is a screen display showing operation of a program integration wizard in allowing the user to identify program fragments to various phases of the area-model of FIGS. 4 and 5 and showing the underlying files collected together in the library of the program fragments organized by equipment names.

Referring to FIG. 6, the control program integration wizard 56 displays on programming terminal 24 two juxtaposed menus, a library menu 82 (depicted on the left side of FIG. 6) and an area-model menu 84, the latter being the hierarchical list of tags 68 and 78 formed by process blocks 62 and 70. Thus, using the example of FIG. 4, in which two tanks are identified as equipment, and of FIG. 5, wherein the "agitate" phase of operation is linked to each tank, the area-model 55 shows in hierarchical form the tags "tank1" and "tank2" having dependent "agitate" phases underneath them.

The library menu 82, depicted in the left side of the display, provides a directory of program fragments stored in "object templates" 86 in the library 58. These program fragments may be prewritten for particular industries by a vendor or may be prepared by the user using the control program developer 40. The program fragments can be arbitrarily arranged in object templates 86 but in the preferred embodiment the program fragments are logically grouped in object templates 86, denoted by the names of particular arranged equipment and/or control phases, but not necessarily equipment and/or control phases having the same names as the tags 68 and 78 of the area-model 55. More generally, a given object template 86 in the library 58 will associate a number of different types of data (not necessarily program fragments only) according to any commonality of that data but preferably will include program fragments that share control variables of some kind.

In the preferred embodiment, a given object template 86 may include a control program fragment 87 (here named "motor") composed of function blocks 88 having input or output variables 89 according to conventions well known in the art (given the suffix DAF) and an HMI file 91 (here termed "panel") providing program fragments for visual HMI controls 90 having underlying control variables 92 (given the suffix GFX). The object template 86 may also include a parameter file 94 (also termed "panel" to link it to the HMI file) indicating a renaming of the variables of the HMI controls 90 and function blocks 88 as will occur during the process to now be described (given the suffix PAR).

Generally the parameter file 94 is in the form of a default value 95 initially defining a prefix applicable to all files of the object template 86. In the example of FIG. 6 the prefix is "motor" indicating the name of the object template 86. Each of the control variables 89 and HMI variables 92 in the various program fragments of the object template 86 take the prefix "motor" to uniquely identify them from other program fragments of other object templates 86.

Figure 7:
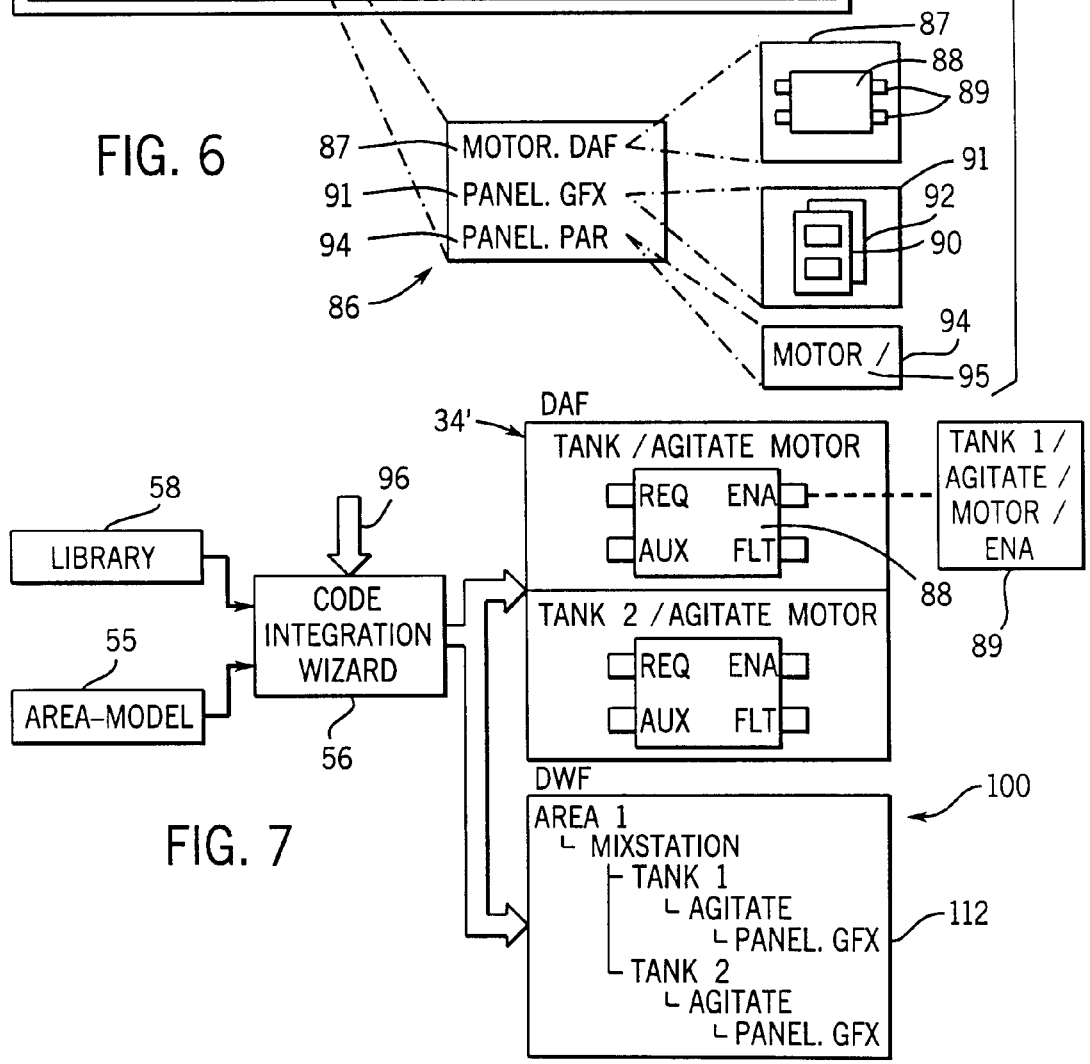
FIG. 7 is a data flow chart showing operation of the program integration wizard in accepting user input, and library and area-model information to produce a control program and a wizard file used for later connections of other program fragments.

Referring also to FIGS. 3 and 7, the program fragments of the library 58 are matched to parts of the area-model 55 by the control program integration wizard 56 according to user input 96 as indicated by process block 85 of FIG. 3. Specifically, the user "drag and drop" object templates 86 from menu 82 to phases of operations in menu 84. As this process continues, each of the control program fragments 87 of the DAF files are collected together to form the control program copy 34' and at the same time, the names of the control variables 89 are updated to reflect the hierarchy of the area-model menu 84. Thus for example, a function block 88 from the "motor" DAF file of an object template 86 may include four control variables named REQ indicating a request to activate the motor, AUX indicating that the motor has been actuated, ENA enable indicating an enabling of the motor and FLT indicating a fault with the operation of the motor. Each of these variables is made unique from other variables of other instances of the object template 86 by concatenating onto it first the "motor" prefix from the parameter file 94. Thus the AUX variable becomes "motor\AUX". This distinguishes these control variables from the like named variables of similar function blocks 88 that may be found in other object templates 86. Upon the connection of the program fragment to the area-model, for example the "agitate" phase of operation of "tank1", these tags are also concatenated onto the variable names so that "motor\AUX" becomes "tank1\agitate\motor\AUX".

The program fragments with their control variables, thus renamed, are collected to form the control program copy 34'. Generally, the control program fragments 87 may include many interconnected function blocks 88.

Thus, each function block 88 of a program fragment added in this manner to the control program copy 34' represents but one instance of that program fragment that may be duplicated many times. As noted, the variables 89 of the function block 88 will be uniquely identified so as to not conflict with variables of other program fragments or other instances of this program fragment in the control program copy 34'. While arbitrary renaming of the variables could be performed to prevent conflict, the use of the area-model 55 both provides a logical and intuitive renaming convention and a renaming convention that preserves the fundamental identity of the variables such as may be necessary for the interconnection of control variables 89 between instances of the function blocks 88, or the connection of the control variables 89 to variables 92 of HMI files 91 as will be described below.

The control program integration wizard 56 produces a wizard file 100 (termed a DWF file) providing connection information indicating how the object templates 86 were instantiated to forming the control program copy 34'. In particular, the wizard file 100 provides information about the underlying area-model 55, thus reflecting the format of area-model menu 84 and provides each phase of operation of the area-model 55 in hierarchical form depending from the equipment. Importantly, the wizard file 100 also lists those files of the instantiated object templates 86 other than the control program files 87, thus indicating other related program fragments, such as HMI program fragments, that are related to the program fragments already a part of the control program copy 34' and which may, thus, be connected to the control program copy 34'. While these other files may be files of any kind including graphics, text, or the like, most importantly these files include HMI files 91 that share common input or output variables with the instantiated control program files 87. Thus for example, the file "panel.GFX" may be listed in the wizard file 100 representing a HMI control that shares control variables with the program fragment of "motor.DAF" already incorporated into the control program copy 34'.

Referring now to FIG. 8, as an example, an HMI program fragment: "panel GFX" may provide for a visual button panel 102 having an ON button 104 and an OFF button 106 allowing for control of and indication of the status of a motor controlled by the "motor.DAF" program fragment holding function block 88. Underlying this "panel.GFX" file are variables REQ and AUX corresponding to the like named control variables of the function block 88. This linkage is implicit in the fact that both of the program fragments were in the same object template 86 and have the control variables with the same root names.

Referring to FIGS. 3 and 8, HMI program 50 may be developed per process block 109 of FIG. 3 by using an HMI integration wizard 57 which receives the wizard file 100 and the object templates 86 of the library 58. When each HMI program fragment, for example, a GFX file from the wizard file 100 is selected for instantiation into the control program copy 34', its associated parameter file: e.g., "panel PAR", is updated so that the default value 95 includes the hierarchy established by the area-model 55 as reflected in the wizard file 100. For example, in the case of an HMI program fragment associated with equipment "tank 1" and the phase of operation "agitate" the default value changes from "motor" to become "tank1\agitate\motor". The default value is used to rename the variable 92 prior to the collection of the HMI controls 90- into the HMI program 50 according to process block 11 of FIG. 3. This default value 95 forms a prefix for each of the variables 92 of the HMI program fragment. Accordingly, the "panel.GFX" program file, providing HMI functions, is automatically connected with the program fragment "motor DAF" even after it has been instantiated into the control program copy 34' under the "tank1" and its variables renamed.

Therefore, the library 58, together with the wizard file 100, allows the variable names of the multiple program fragments of an object template to be correctly updated in unison according to linkages to the area-model 55 established by the user. In particular, the user may select a particular HMI control displayed graphically, for example, that indicated by entry 112 in the wizard file 100 and drag it to a workspace 110 whereupon the graphic representing the control becomes apparent and the connections are established by the updating of the parameter file. The updating of the parameter file simply follows the path from the program fragment in the wizard file 100 through the hierarchy of the wizard file 100 to concatenate names of the overarching phase of operation and equipment into the tag that will be used to identify the control variables. In this manner, essentially automatic connection may be had between the HMI program and the underlying control program.

It will be understood that multiple instances of an HMI control such as the panel 102 may be created for the multiple instances of a "motor.DAF" or similar control program fragment and that, on the other hand, not all control program fragments may have HMI controls associated with them. Further, it is possible that multiple HMI controls may be associated with a particular control program fragment. It will be recognized further that this technique is not limited to connecting HMI controls to control program fragments, but may be also used to connect different control program fragments together according to common shared variables. In each case, the proper denotation of the control variables of the program fragments is automatically performed according to the area-model 55.

In summary, by collecting together within a library heading various different types of programs, an implicit linkage between those program control variables may be established indicating the propriety of assuming that control variables of the same name are in fact the same control variable. This allows later interconnection of the different program fragments even after they have been multiple instants and renamed to create an overarching control program. A significant problem in integrating the HMI aspect of a control program with the control program is ensuring that the variable names still match after the renaming incident to multiple instancing of the control program fragments. The use of a library system in which these disparate elements of a control program are held together in a single file allows the renaming process of the control program fragments to be reproduced at a later time for the HMI process fragments or other program fragments allowing them to be reconnected without undue programmer effort.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. A development tool for creating control programs executable on an industrial controller to control a controlled process, the development tool implemented on an electronic computer and comprising:

an area-model developer generating an area-model representing physical equipment and phases of operation of the physical equipment used in the controlled process, the area-model linking phases of operation to the physical equipment in a hierarchy;

a library providing a plurality of program fragments executable on the industrial controller to perform the phases of operation, the program fragments having control variables representing physical inputs or physical outputs communicating with the controlled process; and a program integration wizard receiving the area-model and the library and accepting input from a user to match program fragments from the library to phases of operation of particular equipment in the area-model to produce the control program and upon the matching to uniquely denote the control variables of all program fragments of the control program according to the hierarchy.

2. The development tool of claim 1, wherein the area-model developer provides a unique text tag for each representation of physical equipment when multiple instances of the same type of physical equipment are used in an area-model.

3. The development tool of claim 1, wherein the area-model developer provides a unique text tag for each representation of phase of operation when multiple instances of the same type of phases of operation are used in an area-model.

4. The development tool of claim 3, wherein the unique text tags for each phase of operation is produced by concatenating the unique text tag of the representation of the physical equipment to a text tag of the phase of operation associated with that physical equipment.

5. The development tool of claim 1, wherein the area-model is displayed on a graphic terminal in a manner depicting the hierarchy of phases of operation dependent on associated physical equipment.

6. The development tool of claim 1, wherein the program integration wizard uniquely denotes the control variables of all program fragments by concatenating a unique identifier onto a preexisting control variable tag;

whereby the original control variable tag may be discerned for matching to other program fragments having similar tags.

7. The development tool of claim 6, wherein the unique identifier is a unique identifier of the equipment and phase of operation with which the program fragment is associated.

8. The development tool of claim 1, wherein the representations of physical equipment and phases of operation are icons displayable on a graphics terminal and the area-model receives user input to link the equipment to the phases of operation by connecting icons of the equipment and the phases of operation as depicted on the graphics terminal.

9. The development tool of claim 1, wherein the area-model developer provides icons indicating types of industrial equipment and phases of operation and the area-model receives user input to create multiple instances of equipment or phases of operation by duplicating the icons represented on the graphics terminal.

10. The development tool of claim 1, wherein the icons of the physical equipment and the icons of the phases of operation are associated by selecting the icon of phases of operation while the icon of physical equipment has focus.

11. The development tool of claim 1, wherein focus on the icon of a physical equipment enlarges the icon of the physical equipment.

12. The development tool of claim 1, wherein the program integration wizard displays tiled depictions of the area-model and the program fragments and the input from the user drags representations of program fragments to phases of operations of the area-model.

13. The development system of claim 12, wherein the depictions of the model is hierarchical showing the phases of operation dependent of the equipment.

14. The development tool of claim 13, wherein the hierarchical depiction uses unique text tags to represent each of the physical equipment.

15. The development tool of claim 1, wherein the program fragments are portions of function block programs.

16. The development tool of claim 1, including further, a second integration wizard receiving information about the matching of program fragments to phases of operation of the model to accept further input from a user to match second program fragments to the first program fragments.

17. The development tool of claim 16, wherein the second program integration wizard receives the further input from the user is received by providing a listing of second program fragments having control variables with text tags matching the text tags of program fragments previously matched to the phases of operation prior to the first program integration wizard uniquely denoting the control variables of all program fragments of the control program.

18. The development tool of claim 17, wherein the second program fragments provide graphic interfaces to the user indicating values of the control variables used by the first program fragments.

19. A method of creating control programs executable on an industrial controller to control a controlled process, the method comprising:

generating a model having a plurality of entities corresponding to physical equipment and phases of operation for the physical equipment employed in the controlled process, wherein the entities are hierarchically-ordered within the model;

providing a plurality of object templates from at least one library that are executable on the industrial controller, wherein the object templates have control variables that are representative of at least one of physical inputs and physical outputs of the controlled process;

receiving user inputs to match the object templates with the entities; and instantiating objects from the object templates with respect to the entities in response to the user inputs to produce a complete control program, wherein the instantiating includes automatically and uniquely denoting the control variables of all of the instantiated objects of the control program.

20. The method of claim 19, wherein the denoting of the control variables occurs by concatenating unique identifiers onto preexisting control variable tags.

* * * * *